US011683489B2

(12) United States Patent
Chao et al.

(10) Patent No.: US 11,683,489 B2
(45) Date of Patent: Jun. 20, 2023

(54) MONOCHROME PALETTE MODE FOR VIDEO CODING

(71) Applicant: QUALCOMM Incorporated, San Diego, CA (US)

(72) Inventors: Yung-Hsuan Chao, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/132,836

(22) Filed: Dec. 23, 2020

(65) Prior Publication Data

US 2021/0203930 A1    Jul. 1, 2021

Related U.S. Application Data

(60) Provisional application No. 62/953,713, filed on Dec. 26, 2019.

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/157* (2014.11); *H04N 19/176* (2014.11); *H04N 19/186* (2014.11); *H04N 19/70* (2014.11)

(58) Field of Classification Search
CPC .. H04N 19/103; H04N 19/119; H04N 19/136; H04N 19/157; H04N 19/70
See application file for complete search history.

(56) References Cited

U.S. PATENT DOCUMENTS

| 2015/0341655 A1* | 11/2015 | Joshi | H04N 19/50 |
| | | | 375/240.16 |
| 2016/0182913 A1* | 6/2016 | Joshi | H04N 19/139 |
| | | | 375/240.08 |

(Continued)

FOREIGN PATENT DOCUMENTS

| WO | WO-2020243399 A1 * | 12/2020 | ........... H04N 19/119 |
| WO | WO-2021030667 A1 * | 2/2021 | ........... H04N 19/124 |
| WO | WO-2021030786 A1 * | 2/2021 | ........... H04N 19/103 |

OTHER PUBLICATIONS

Bross B., et al., "Versatile Video Coding (Draft 7)", 16. JVET Meeting, Oct. 1, 2019-Oct. 11, 2019, Geneva, (The Joint Video Exploration Team of ISO/IEC JTC1/SC29/WG11 and ITU-T SG. 16), No. JVET-P2001, Nov. 14, 2019 (Nov. 14, 2019), XP030224330, 494 Pages Retrieved from the Internet: URL: http://phenix.int-evry.fr/jvet/doc_end_user/documents/16_Geneva/wg11/JVET-P2001-v14.zip JVET-P2001-vE.docx [retrieved on Nov. 14, 2019] pp. 77-78.

(Continued)

*Primary Examiner* — Mainul Hasan
(74) *Attorney, Agent, or Firm* — Shumaker & Sieffert, PA

(57) ABSTRACT

A method of decoding video data includes determining that a current block of the video data is coded in palette mode, determining, between single tree or dual tree partitioning, that the current block is coded with single tree partitioning enabled, determining that the current block is coded in monochrome format, when the current block is coded with single tree partitioning enabled and when the current block is coded in monochrome format, determining that a number of color components used for palette mode decoding the current block is equal to one, and palette mode decoding the current block based on the determined number of color components used for palette mode decoding the current block being equal to one.

21 Claims, 6 Drawing Sheets

(51) Int. Cl.
H04N 19/157 (2014.01)
H04N 19/70 (2014.01)
H04N 19/186 (2014.01)

(56) References Cited

U.S. PATENT DOCUMENTS

| | | | |
|---|---|---|---|
| 2016/0227226 A1* | 8/2016 | Rapaka | H04N 19/103 |
| 2016/0234494 A1* | 8/2016 | Seregin | H04N 19/176 |
| 2016/0345030 A1* | 11/2016 | Karczewicz | H04N 19/70 |
| 2017/0085891 A1* | 3/2017 | Seregin | H04N 19/182 |
| 2018/0091829 A1* | 3/2018 | Liu | H04N 19/436 |
| 2020/0092546 A1* | 3/2020 | Ye | H04N 19/593 |
| 2020/0260096 A1* | 8/2020 | Ikai | H04N 19/44 |
| 2021/0168377 A1* | 6/2021 | Sarwer | H04N 19/186 |

OTHER PUBLICATIONS

Chang Y-J., et al., "On the Parsing Process for the Palette Mode", 22. JCT-VC Meeting; Oct. 15, 2015-Oct. 21, 2015; Geneva; (Joint Collaborative Team on Video Coding of ISO/IEC JTC1/SC29/WG11 and ITU-T SG.16); URL: http://wftp3.itu.int/av-arch/jctvc-site no. JCTVC-V0047-v3, Oct. 15, 2015 (Oct. 15, 2015), pp. 1-6, XP030117696, figures 1-3.
International Search Report and Written Opinion—PCT/US2020/067005—ISA/EPO—dated Mar. 18, 2021 (201560WO) (15 pp).
Liao R.L., (Alibaba-Inc) et al., "CE2-Related: Palette Mode for Non 4:4:4 Color Format", 17. JVET Meeting, Jan. 7, 2020-Jan. 17, 2020, Brussels, (The Joint Video Exploration Team of ISO/IEC JTC1/SC29/WG11 and ITU-TSG.16 ), No. JVET-Q0504, Jan. 1, 2020 (Jan. 1, 2020). XP030223732, 6 pages, Retrieved from the Internet: URL: http://phenix.int-evry.fr/jvet/doc_end_user/documents/17_Brussels/wg11/JVET-Q0504-v1.zip. JVET-Q0504-v1.docx [retrieved on Jan. 1, 2020].
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 29, 20th Meeting, by Teleconference, Oct. 7-16, 2020, pp. 1-515.

* cited by examiner

MONOCHROME PALETTE MODE FOR VIDEO CODING

This application claims the benefit of U.S. Provisional Application No. 62/953,713, filed Dec. 26, 2019, the entire contents of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for enabling palette mode coding for monochrome content and/or enabling palette mode coding when separate color plane coding is used. The example techniques may be applicable to video coding standards such as the Versatile Video Coding (VVC) standard but may be applicable to other video coding standards, and generally to video coding techniques, including standard and non-standard based video coding techniques.

As described in more detail, in some examples, a picture may be partitioned in accordance with dual tree partitioning or single tree partitioning. In dual tree partitioning, there may be different partitioning of the luma component of the picture and the chroma components of the picture. In single tree partitioning, the luma component of the picture and the chroma components of the picture are partitioned in the same manner.

This disclosure describes examples of determining a number of color components used for palette mode coding utilizing both the partitioning (e.g., single tree or dual tree partitioning) and color format as criteria (e.g., whether monochrome format or not). In this manner, when a video decoder is performing operations defined by a palette mode coding syntax structure, the video decoder may correctly determine the number of color components used for palette mode coding a current block.

In one example, the disclosure describes a method of decoding video data, the method comprising determining that a current block of the video data is coded in palette mode, determining, between single tree or dual tree partitioning, that the current block is coded with single tree partitioning enabled, determining that the current block is coded in monochrome format, when the current block is coded with single tree partitioning enabled and when the current block is coded in monochrome format, determining that a number of color components used for palette mode decoding the current block is equal to one, and palette mode decoding the current block based on the determined number of color components used for palette mode decoding the current block being equal to one.

In one example, the disclosure describes a device for coding video data, the device comprising a memory configured to store the video data and processing circuitry coupled to the memory and configured to determine that a current block of the video data is coded in palette mode, determine, between single tree or dual tree partitioning, that the current block is coded with single tree partitioning enabled, determine that the current block is coded in monochrome format, when the current block is coded with single tree partitioning enabled and when the current block is coded in monochrome format, determine that a number of color components used for palette mode decoding the current block is equal to one, and palette mode decode the current block based on the determined number of color components used for palette mode decoding the current block being equal to one.

In one example, the disclosure describes a computer-readable storage medium having stored thereon instructions that, when executed, cause one or more processors to determine that a current block of the video data is coded in palette mode, determine, between single tree or dual tree partitioning, that the current block is coded with single tree partitioning enabled, determine that the current block is coded in monochrome format, when the current block is coded with single tree partitioning enabled and when the current block is coded in monochrome format, determine that a number of color components used for palette mode decoding the current block is equal to one, and palette mode decode the current block based on the determined number of color components used for palette mode decoding the current block being equal to one.

In one example, the disclosure describes a device for decoding video data, the device comprising means for determining that a current block of the video data is coded in palette mode, means for determining, between single tree or dual tree partitioning, that the current block is coded with single tree partitioning enabled, means for determining that the current block is coded in monochrome format, means for determining that a number of color components used for palette mode decoding the current block is equal to one when the current block is coded with single tree partitioning enabled and when the current block is coded in monochrome format, and means for palette mode decoding the current block based on the determined number of color components used for palette mode decoding the current block being equal to one.

The details of one or more examples are set forth in the accompanying drawings and the description below. Other features, objects, and advantages will be apparent from the description, drawings, and claims.

DETAILED DESCRIPTION

Figure 1:
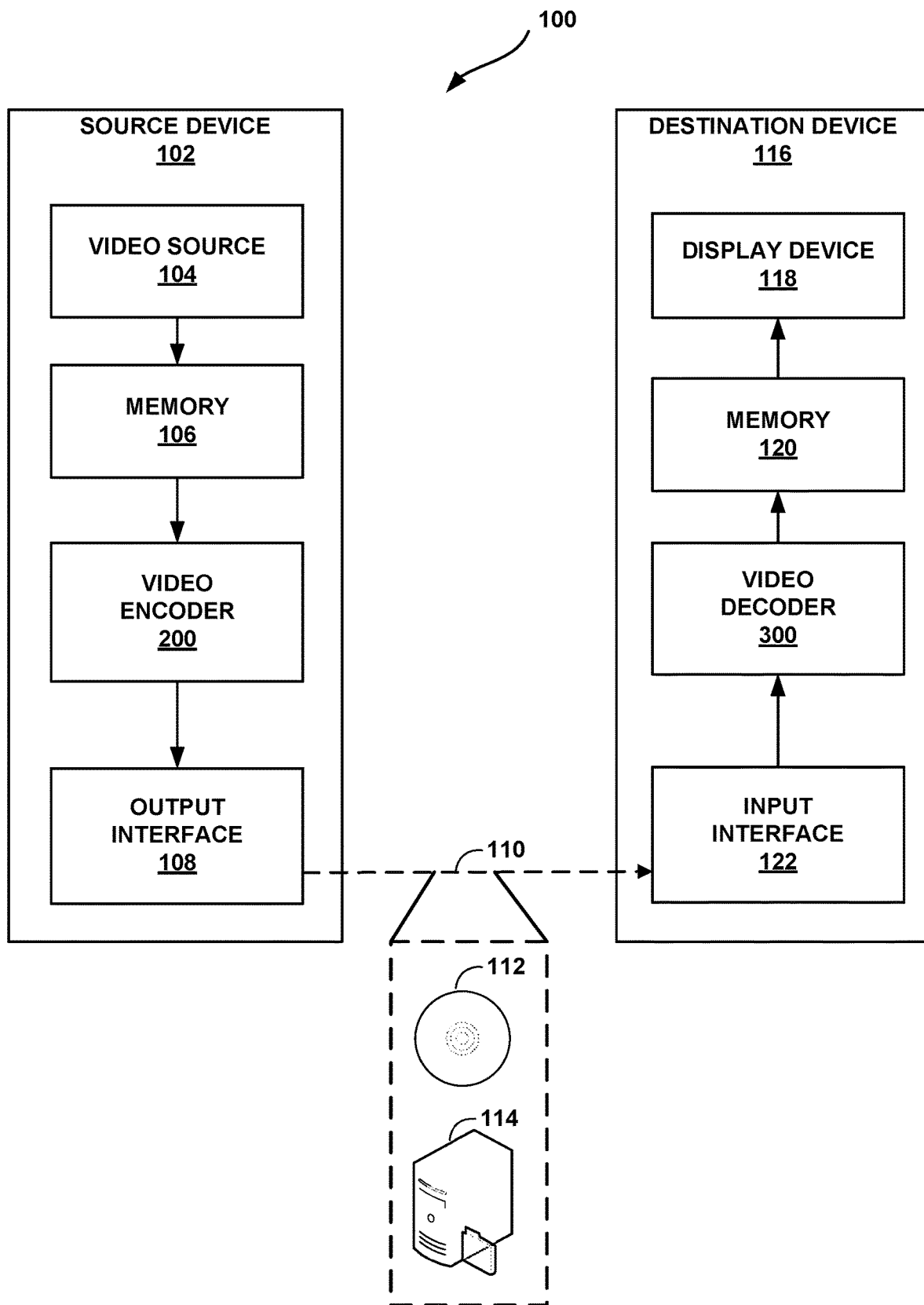
FIG. 1 is a block diagram illustrating an example video encoding and decoding system that may perform the techniques of this disclosure.

In video coding, an example coding mode is palette mode coding. In palette mode coding, a video encoder signals a palette mode table that includes sample values referenced by an index into the palette mode table, and the video decoder constructs the palette mode table based on the signaled sample values. For a sample in a current block, the video encoder signals an index into the palette mode table, and the video decoder determines the sample value for the sample in the current block based on the sample value in the palette mode table associated with the index into the palette mode table. Palette mode coding may be available regardless of the color format. For example, palette mode coding may be available where there are both luma and chroma components or where there is only luma component (e.g., monochrome). For example, monochrome is a color format, sometimes referred to as 4:0:0 color format to indicate that there is only the luma component a block and there are no chroma components for the block.

Palette mode coding may be beneficial in screen content coding, as one non-limiting example. For instance, if a string of samples in the current block have same values or same values as neighboring samples, the video encoder may signal a run length indicating the number of samples in the string, rather than signal an index per sample. The video decoder may determine the sample values for the samples in the string of samples based on neighboring samples, rather than needing to process indexes into the palette mode table for the samples in the string of samples. In some examples, the sample value for a sample may not be present in the palette mode table (referred to as an escape sample or escape pixel), and in such examples, the video encoder may signal the actual sample value for such an escape sample.

In video coding, there may also be partitioning tree types. The partitioning tree type indicates the manner in which a picture is partitioned into blocks. Examples of partitioning types include dual tree partitioning and single tree partitioning. In single tree partitioning, both the luma and chroma components of a picture are partitioned using the same tree structure, and therefore, the luma and chroma components are partitioned in the same manner. In dual tree partitioning, the luma and chroma components may be partitioned using different tree structures, and therefore, the luma and chroma components may not be partitioned in the same manner.

This disclosure describes example techniques in which both the partitioning tree type and the color format (e.g., whether monochrome or not) are factors that impact a number of color components used for palette mode coding (e.g., encoding or decoding) a current block. The number of color components used for palette mode coding a current block may refer to the number of color components in the palette mode table. Accordingly, the number of color components used for palette mode coding may be considered as a number of color components used for palette mode coding. Examples of the color components include luma component and chroma components.

For example, when a first block is coded with single tree partitioning enabled and when the first block is coded in monochrome format, a video coder (e.g., video encoder or video decoder) may determine that a number of color components used for palette mode coding the first block is equal to one. For instance, the video decoder may decode the first block based on a palette mode table only for luma component (e.g., the palette mode table includes sample values only for luma component). However, when a second block is coded with single tree partitioning enabled and when the second block is not coded in monochrome format, a video coder may determine that a number of color components used for palette mode coding the second block is equal to three. For instance, the video decoder may decode the second block based on a palette mode table containing both luma component and chroma components (e.g., the palette mode table includes sample values for both luma component and chroma components).

As described in more detail, the video decoder may determine the number of color components used for palette mode coding as part of performing operations defined in a palette mode coding syntax structure. By utilizing information indicative of partitioning tree type and information indicative of color format (e.g., monochrome or not), the video decoder may properly determine the number of color components used for palette mode coding, as part of performing the operations defined in the palette mode coding syntax structure.

For example, some other techniques determine whether single tree partitioning or dual tree partitioning was enabled, and if single tree partitioning was enabled, determined that the number of color components used for palette mode coding is three (e.g., palette mode table included sample values for both luma component and chroma components). However, such other techniques failed to account that if the color format is monochrome format, then the number of color components used for palette mode coding should not be three, but rather only one because monochrome format only includes luma component. In the example techniques described in this disclosure, because both the partitioning tree type and the color format (e.g., monochrome or not) are factors in the determining the number of color componentsnumber of color components used for palette mode coding, the video decoder may correctly determine the number of color componentsnumber of color components used for palette mode coding.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for enabling palette mode for monochrome content and/or when separate color plane coding is used. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for enabling palette mode for monochrome content and/or when separate color plane coding is used. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to any of a variety of multiplexer protocols).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

One example of a video coding standard is ITU-T H.265, also referred to as High Efficiency Video Coding (HEVC) or extensions thereto, such as the multi-view and/or scalable video coding extensions. Video encoder 200 and video decoder 300 may operate according to other proprietary or industry standards, such as ITU-T H.266, also referred to as Versatile Video Coding (VVC). A recent draft of the VVC standard under development is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v14, sometimes also referred to as JVET-P2001-vE, (hereinafter "VVC Draft 7"). A more recent draft of the VVC standard under development is described in Bross, et al. "Versatile Video Coding Editorial Refinements on Draft 10," Joint Video Experts Team (JVET) of ITU-T SG 16 WP 3 and ISO/IEC JTC 1/SC 29, 20$^{th}$ Meeting: by teleconference, 7-16 Oct. 2020, JVET-T2001-v11, (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data, also called luma component and chroma components. However, luminance and chrominance data is not required in all examples. For instance, in monochrome format, there may only be luminance data (e.g., luma component) with no chrominance data (e.g., no chroma component).

In general, video encoder 200 and video decoder 300 may code video data represented in a YUV (e.g., Y, Cb, Cr) format or just Y for monochrome. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components). That is, in examples where video encoder 200 and video decoder 300 utilize single QTBT or MTT structure, video encoder 200 and video decoder 300 may be considered as utilizing a single tree partitioning. In examples where video encoder 200 and video decoder 300 utilize two or more QTBT or MTT structures, video encoder 200 and video decoder 300 may be considered as utilizing a dual tree partitioning. Accordingly, video encoder 200 and video decoder 300 may be configured to determine, between single tree or dual tree partitioning, whether a current block is coded with single tree partitioning enabled or with dual tree partitioning enabled.

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

In some examples, VVC provides an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. In some examples, VVC provides sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

The above describes examples techniques for video coding, such as with inter-prediction and intra-prediction. Another example video coding technique is palette mode coding. In applications like remote desktop, collaborative work and wireless display, computer-generated screen content (e.g., such as text or computer graphics) may be the dominant content to be compressed. This type of content tends to have discrete-tones and feature sharp lines and high contrast object boundaries. The assumption of continuous-tone and smoothness may no longer apply for screen content, and thus traditional video coding techniques may not be efficient ways to compress video data including screen content.

In general, palette coding is designed to handle the clustering of colors in screen content. Palette coding employs base colors and an index map to represent the input image block. Video encoder 200 may quantize samples to one of the base colors in the input block and an index map may be generated to indicate the corresponding base color for each sample. Due to the sparse histogram of screen contents, the coding cost is significantly reduced by a small number of colors in each block.

Video encoder 200 and video decoder 300 may code a table named 'Palette' (e.g., referred to as palette mode table) for a CU to indicate the base colors which may appear in the CU. The palette mode table may include color entries (e.g., sample values), each of which are represented by an index. The palette mode table may include color entries in any color format, e.g., RGB, YCbCr, or another color format. Video encoder 200 and video decoder 300 may code the palette using predictive techniques to save bits. After that, video encoder 200 and video decoder 300 may code the samples (e.g., the luma and chroma color components of a pixel) in the current CU. Video encoder 200 may quantize a sample to one of the base colors in the palette. Then, video encoder 200 may code the index corresponding to that base color. To code indices for all of the samples more efficiently, video encoder 200 may put the indices together as an index map and code the index map as a whole. Video encoder 200 and video decoder 300 may be configured to scan the samples in the index map horizontally or vertically in a rotated way.

For monochrome format, since there is no chroma component, the palette mode table may include sample values only for luma component. For other color formats that include chroma component, the palette mode table may include sample values for luma component and chroma components. For instance, video encoder 200 and video decoder 300 may determine a number of color componentsnumber of color components used for palette mode coding a current block. The number of color componentsnumber of color components used for palette mode coding the current block may refer to the number of color componentsnumber of color components included the palette mode table. For monochrome, the number of color componentsnumber of color components used for palette mode coding may be one (e.g., luma only), and for other color formats that include luma and chroma components, the number of color components used for palette mode coding may be three (e.g., luma and two chroma components).

Video encoder 200 may be configured to determine to apply an INDEX mode to signal the index for a particular sample. Video encoder 200 may also determine to use a COPY_ABOVE mode. In a COPY_ABOVE mode, the index for a sample is copied from the index of its above neighboring sample. Video encoder 200 may signal a bit to indicate which mode is used for a particular sample. To further reduce bits, several consecutive samples may share the same mode. Video encoder 200 may code a run length to represent how many consecutive samples share the same mode. If the current sample utilizes INDEX mode, then a number of consecutive samples indicated by the run length will share the same index as the current sample. If the current sample utilizes COPY_ABOVE, a number of consecutive samples indicated by the run length will share the COPY_ABOVE mode, i.e., video decoder 300 will copy the indices from their above neighboring samples for these samples. In addition, a sample can also be coded directly (i.e., video encoder 200 may directly encode a sample value) in an ESCAPE mode to handle outlier cases (e.g., sample values not in the palette mode table).

In accordance with the techniques of this disclosure, palette mode may be enabled for monochrome content and/or when separate color plane coding is used. For example, video encoder 200 and video decoder 300 may determine that one or more blocks are for monochrome content (e.g., have color format of monochrome or are coded as monochrome content) and/or determine that one or more blocks are for separate color plane coding (e.g., there are plurality of color planes and the one or more blocks are for at least one of the color planes). Video encoder 200 or video decoder 300 may code (e.g., encode for video encoder 200 or decode for video decoder 300) the one or more blocks with palette mode.

For example, as described above, in one or more examples, the color format and partitioning tree type may be factors in determining a number of color componentsnumber of color components used for palette mode coding. In accordance with one or more examples, a video coder (e.g., video encoder 200 or video decoder 300) may determine that a current block of the video data is coded in palette mode, and determine, between single tree or dual tree partitioning, that the current block is coded with single tree partitioning enabled. In such examples, the video coder may determine that the current block is coded in monochrome format. When the current block is coded with single tree partitioning enabled and when the current block is coded in monochrome format, the video coder may determine that a number of color componentsnumber of color components used for palette mode coding the current block is equal to one. The video coder may palette mode code (e.g., encode or decode) the current block based on the determined number of color componentsnumber of color components used for palette mode coding the current block being equal to one.

As one example, to palette mode code the current block, the video coder may palette mode code the current block based on a palette mode table only for luma component. For example, video decoder 300 may receive an index into the palette mode table for a sample in the current block, and assign the sample in the current block a luminance value based on the index into the palette mode table. Video encoder 200 may determine a luminance value for a sample in the current block, determine an index into the palette mode table based on the determined luminance value for the sample, and signal information indicative of the index into the palette mode table for a sample in the current block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
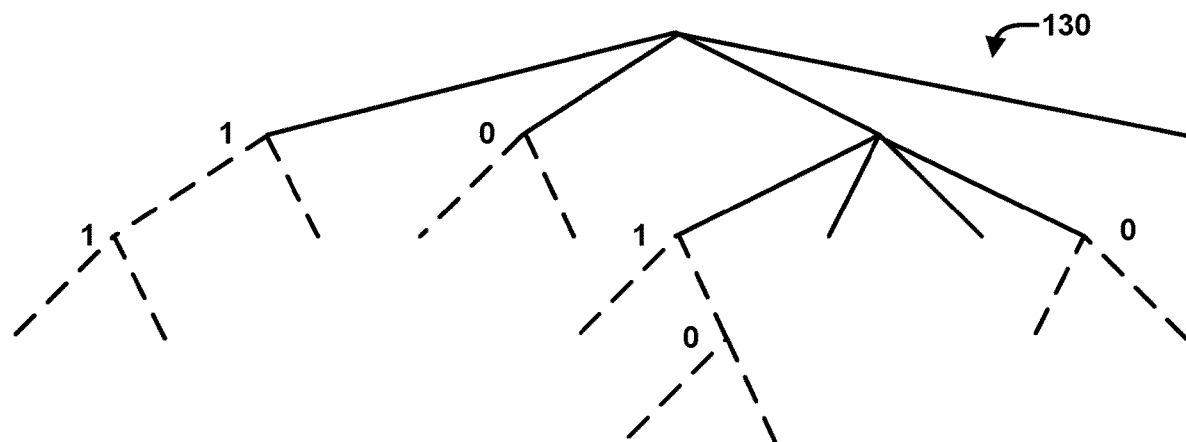
FIGS. 2A and 2B are conceptual diagrams illustrating an example quadtree binary tree (QTBT) structure, and a corresponding coding tree unit (CTU).
Figure 2B:
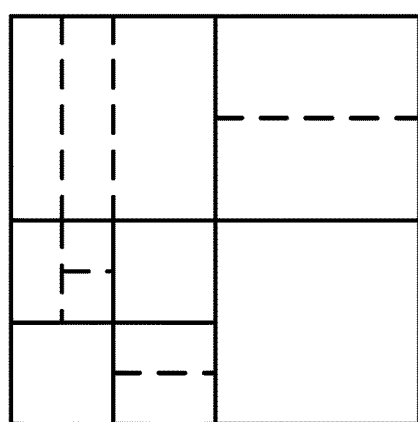

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBT-Size) or the maximum allowed binary tree depth (MaxBT-Depth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

VVC Draft 7 describes a palette mode that is applied for 4:4:4 content (e.g., luma and chroma components are of the same size). VVC Draft 7 already supports luma only mode when dual tree partitioning is enabled. For example, with dual tree partitioning enabled, the luma components and the chroma components may be partitioned in different manners. Accordingly, in some examples, palette mode may be applied with dual tree partitioning such that the palette mode coding is applied to each of the luma and chroma components separately because the partitioning of the luma and chroma components is different.

As described above, dual tree partitioning may be where a luma component and a chroma component are partitioned differently. In single tree partitioning, luma and chroma components are partitioned in the same way. However, VVC Draft 7 may not support palette mode and palette mode is not applied for monochrome content and when separate color plane coding is used. Monochrome content may be also known as 4:0:0 chroma format or chroma sampling type.

In some examples, palette mode, dual tree partitioning, and separate color planes coding control flags are signaled in a SPS (sequence parameter set). The following are examples of the signaling.

```
if( chroma_format_idc = = 3 )
    separate_colour_plane_flag         u(1)
```

```
if( ChromaArrayType ! = 0 )
    qtbtt_dual_tree_intra_flag         u(1)
```

```
if( chroma_format_idc = = 3 ) {
    sps_palette_enabled_flag           u(1)
    sps_act_enabled_flag               u(1)
}
``` sps_palette_enabled_flag equal to 1 specifies that pred_mode_plt_flag may be present in the coding unit syntax. sps_palette_enabled_flag equal to 0 specifies that pred_mode_plt_flag is not present in the coding unit syntax. When sps_palette_enabled_flag is not present, it is inferred to be equal to 0.

qtbtt_dual_tree_intra_flag equal to 1 specifies that for I slices, each CTU is split into coding units with 64×64 luma samples using an implicit quadtree split and that these coding units are the root of two separate coding_tree syntax structures for luma and chroma. qtbtt_dual_tree_intra_flag equal to 0 specifies separate coding_tree syntax structure is not used for I slices. When qtbtt_dual_tree_intra_flag is not present, it is inferred to be equal to 0.

separate_colour_plane_flag equal to 1 specifies that the three color components of the 4:4:4 chroma format are coded separately. separate_colour_plane_flag equal to 0 specifies that the color components are not coded separately. When separate_colour_plane_flag is not present, it is inferred to be equal to 0. When separate_colour_plane_flag is equal to 1, the coded picture consists of three separate components, each of which consists of coded samples of one color plane (Y, Cb, or Cr) and uses the monochrome coding syntax. In this case, each color plane is associated with a specific colour_plane_id value.

In some examples, there is no dependency in decoding processes between the color planes having different colour_plane_id values. For example, the decoding process of a monochrome picture with one value of colour_plane_id does not use any data from monochrome pictures having different values of colour_plane_id for inter prediction.

Depending on the value of separate_colour_plane_flag, the value of the variable ChromaArrayType is assigned as follows:
  If separate_colour_plane_flag is equal to 0, ChromaArrayType is set equal to chroma_format_idc.
  Otherwise (separate_colour_plane_flag is equal to 1), ChromaArrayType is set equal to 0.

When separate_colour_plane_flag is set to 1, the three color planes are separately processed as monochrome sampled pictures.

There may be issues with palette mode coding in VVC Draft 7. Palette mode is not applied for monochrome content and separate color plane coding. Because palette mode is already supported in VVC Draft 7 for luma only mode when dual tree partitioning is enabled, it may be possible to enable palette mode for monochrome content and when separate color plane coding is used. For example, palette mode may not be applied for monochrome content and separate color plane coding. There may not be a disadvantage to enable operation of palette mode for monochrome content and separate color plane is used since the palette mode is already supported with a separate luma only mode when dual tree is enabling.

In accordance with examples described in this disclosure, palette mode is enabled for monochrome content and for separate color plane coding, where each plane may be treated as a monochrome signal. In some examples, the disclosure describes examples of reusing a existing luma only palette mode, which is used for a dual tree partitioning, where luma and chroma components can be coded separately in an I-slice. In one or more examples, this luma only operational mode for palette mode is extended for a single tree coding (in VVC dual tree is disabled for monochrome and separate color planes coding) when monochrome context is an input.

Video encoder 200 and video decoder 300 may identify monochrome content by assigning (e.g., by video encoder 200) or checking (e.g., by video decoder 300) chroma_format_idc value (chroma_format_idc=0 indicates monochrome) or by assigning or checking a separate color plane flag (separate_colour_plane_flag=1 indicates that each color plane is coded as monochrome content).

To enable luma only palette mode for monochrome content and separate color plane coding, in one example, video encoder 200 and video decoder 300 may define (e.g., determine) a number of color components involved in the palette mode based on the tree type and chroma_format_idc condition check. For example, if it is a single tree (separate tree or dual tree is disabled) type coding and chroma_format_idc is equal to 0 then the number of color components in palette is set to 1; otherwise it is set to 3.

Stated another way, when the current block is coded with single tree partitioning enabled and when the current block is coded in monochrome format, video encoder 200 and video decoder 300 may determine that a number of color components used for palette mode coding the current block is equal to one. When the current block is coded with single tree partitioning enabled and when the current block is not coded in monochrome format, video encoder 200 and video decoder 300 may determine that a number of color components used for palette mode coding the current block is equal to three.

In VVC Draft 7, in one example, palette mode may be implemented as follows where additions are shown as text between <ADD> and </ADD>:
  numComps=(treeType==SINGLE_TREE) ? (<ADD>ChromaArrayType==0 ?1</ADD>: 3):
  (treeType==DUAL_TREE_CHROMA)? 2:1
In the above example, the derived number of color components may be used in the palette mode syntax signaling.

For example, in the following operation: numComps= (treeType==SINGLE_TREE) ? (ChromaArrayType==0 ? 1:3): (treeType==DUAL_TREE_CHROMA)? 2:1, numComps is equal to the number of color components used for palette mode coding (e.g., a number of color components involved in the palette mode). The number of color components used for palette mode coding may refer to the number of color components that are included in the palette mode table.

In the above operation for determining numComps, the value of numComps is based on the partitioning tree type (e.g., single tree partitioning or not) and whether the block is in monochrome format (e.g., whether ChromaArrayType is 0 or not). For instance, the operation for numComps above can be parsed as follows. If the partitioning tree type is single tree partitioning (e.g., treeType==SINGLE_TREE), then a determination is made if block is coded monochrome format (e.g., ChromaArrayType==0). When the partitioning tree type is single tree partitioning, and when the block is coded in monochrome format, then a number of color components used for palette mode coding the current block is equal to one.

For instance, video encoder 200 and video decoder 300 may determine that a current block of video data is coded in palette mode, and may determine, between single tree or dual tree partitioning, that the current block is coded with single tree partitioning enabled (e.g., treeType==SINGLE_TREE). Video encoder 200 and video decoder 300 may determine that the current block is coded in monochrome format. As one example, in response to determining that the current block is coded with single tree partitioning enabled, video encoder 200 and video decoder 300 may determine that the current block is coded in monochrome format (e.g., in response to treeType being equal to SINGLE_TREE, video encoder 200 and video decoder 300 may determine that ChromaArrayType is equal to 0).

When the current block is coded with single tree partitioning enabled and when the current block is coded in monochrome format, video encoder 200 and video decoder 300 may determine that a number of color components used for palette mode coding the current block is equal to one. For example, in response to determining that the current block is coded with single tree partitioning enabled and in response to determining that the current block is coded in monochrome format (e.g., in response to treeType being equal to SINGLE_TREE and ChromaArrayType being equal to 0), video encoder 200 and video decoder 300 may determine that the current block is coded in monochrome format, determining that the number of color components used for palette mode coding is equal to one (e.g., numComps is equal to 1).

In another example, the number of color components involved in the palette mode processing may be modified for video encoder 200 or video decoder 300 for the case when the number of color components is equal to 3 or supposed to be equal to 3. In such examples, chroma_format_idc is further checked and if it is equal to 0, i.e., monochrome content, the number of color components in palette mode is set to 1.

In one example, the above techniques may be implemented as follows where changes to the VVC Draft 7 are shown with additional language within <ADD> and </ADD>.

Depending on the value of treeType, the variables startComp and numComps are derived as follows:
If treeType is equal to SINGLE_TREE:

startComp=0　(444)

numComps=<ADD>ChromaArrayType==0 ?1</ADD>: 3　(445)

In this example, the derived number of color components may be used in the decoding process of the palette mode. Both of these examples of deriving the number of color components in the palette mode can be used together.

In some examples, both of these modifications are implemented for the palette mode in VVC Draft 7 to support monochrome and separate color plane coding. The changes to the VVC Draft 7 are shown below with additional language within <ADD> and </ADD>.
7.3.9.6. Palette Coding Syntax

```
palette_coding( x0, y0, cbWidth,
cbHeight, treeType ) {                              Descriptor
  startComp = ( treeType = = DUAL_
  TREE_CHROMA ) ? 1 : 0
  numComps = ( treeType = =
  SINGLE_TREE ) ? ( <ADD>
  ChromaArrayType = = 0 ?
  1 </ADD>: 3 ) :
      ( treeType = = DUAL_
      TREE_CHROMA ) ? 2 : 1
  palettePredictionFinished = 0
  NumPredictedPaletteEntries = 0
  for( predictorEntryIdx = 0;
  predictorEntryIdx <
  PredictorPaletteSize[ startComp ]
  &&
    !palettePredictionFinished &&
    NumPredictedPaletteEntries <
    31; predictorEntryIdx++ ) {
```

```
                         -continued
palette_coding( x0, y0, cbWidth,
cbHeight, treeType ) {                              Descriptor
    palette_predictor_run                           ae(v)
      if( palette_predictor_
      run != 1 ) {
        if( palette_predictor_run > 1 )
          predictorEntryIdx +=
          palette_predictor_run - 1
        PalettePredictorEntry-
        ReuseFlags
      [ predictorEntryIdx ] = 1
        NumPredictedPaletteEntries++
      } else
        palettePredictionFinished = 1
      }
 ...
```

8.4.5.3 Decoding Process for Palette Mode
Inputs to this Process are:
  a location (xCbComp, yCbComp) specifying the top-left sample of the current coding block relative to the top-left sample of the current picture,
  a variable treeType specifying whether a single or a dual tree is used and if a dual tree is used, it specifies whether the current tree corresponds to the luma or chroma components,
  a variable cIdx specifying the color component of the current block,
  two variables nCbW and nCbH specifying the width and height of the current coding block, respectively.

Output of this process is an array recSamples[x][y], with x=0 ... nCbW−1, y=0 ... nCbH−1 specifying reconstructed sample values for the block.

Depending on the value of treeType, the variables startComp and numComps are derived as follows:
If treeType is equal to SINGLE_TREE:

startComp=0　(444)

numComps=<ADD>ChromaArrayType==0 ?1</ADD>:3　(445)

Otherwise, treeType is equal to DUAL_TREE_LUMA:

startComp=0　(446)

numComps=1　(447)

Otherwise, treeType is equal to DUAL_TREE_CHROMA:

startComp=1　(448)

numComps=2　(449)

As seen above, numComps= (treeType==SINGLE_TREE) ?(ChromaArrayType==0 ? 1:3):(treeType==DUAL_TREE_CHROMA) ? 2:1, is part of the palette mode coding syntax structure (e.g., 7.3.9.6. Palette coding syntax referenced above). Accordingly, in one or more examples, video decoder 300 may be configured to perform operations defined in a palette mode coding syntax structure (e.g., the operations of 7.3.9.6. Palette coding syntax, as one non-limiting example). In such examples, when the current block is coded with single tree partitioning enabled and when the current block is coded in monochrome, video encoder 200 and video decoder 300 may determine that the number of color components used for palette mode coding the current block (e.g., numComps) is equal to one as part of performing the operations defined in the palette mode coding syntax structure. For instance, video encoder 200 and video decoder 300 may determine the value of numComps as being equal to 1 based on determining that numComps=(treeType==SINGLE_TREE) ?(ChromaArrayType==0 ? 1:3):(treeType==DUAL_TREE_CHROMA) ? 2:1, as part of performing the operations defined in the palette mode coding syntax structure.

In the above example, the current block may be considered as a first block. For a second block, video encoder 200 and video decoder 300 may determine that the second block is coded in palette mode, and determine, between single tree or dual tree partitioning, that the second block is coded with single tree partitioning enabled.

However, in this example, video encoder 200 and video decoder 300 may determine that the second block is not coded in monochrome format (e.g., ChromaArrayType is not equal to 0). In this example, when the second block is coded with single tree partitioning enabled and when the second block is not coded in monochrome format, video encoder 200 and video decoder 300 may determine that a number of color components used for palette mode coding the second block (e.g., numComps for the second block) is equal to three. That is, numComps is equal 3 because treeType is SINGLE_TREE and ChromaArrayType is not 0.

Figure 3:
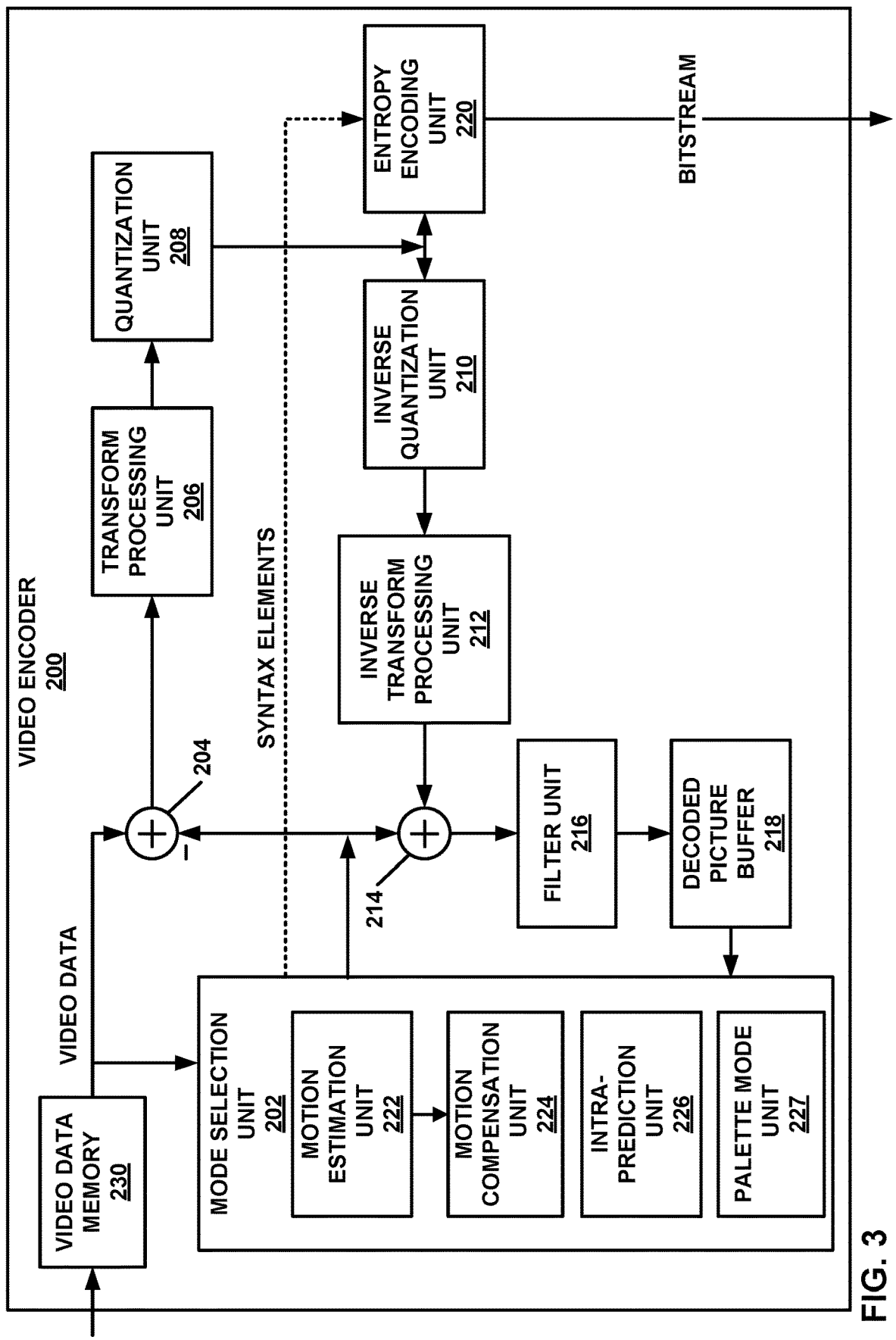
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM).

In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to determine that one or more blocks are for (e.g., contain or include) monochrome content and encode the one or more blocks with palette mode. In some examples, to determine that the one or more blocks are for monochrome content, the processing units may be configured to determine (e.g., assign) a value of a chroma format (e.g., chroma_format_idc), where the value indicates that the one or more blocks are for monochrome content. In some examples, to determine that the one or more blocks are for monochrome content, the processing units may determine (e.g., assign) a value of a separate color plane flag, wherein the value indicates that each color plane is coded as monochrome content, and wherein at least one color plane includes the one or more blocks. In some examples, the processing units may be configured to determine that one or more blocks are for separate color plane coding and encode the one or more blocks with palette mode. In some examples, the processing units may be configured to determine a number of color components for the palette mode based on at least one of tree type or chroma format.

For example, FIG. 3 illustrates palette mode unit 227, which may be configured to perform example techniques described in this disclosure, such as palette mode coding described above, in combination with other components such as mode selection unit 202. As one example, mode selection unit 202 may determine that a current block of video data is coded in palette mode and determine, between single tree or dual tree partitioning, that the current block is coded with single tree partitioning enabled. For example, mode selection unit 202 may test through various encoding passes, and based on the encoding passes determine that palette mode with single tree partitioning provides optimal rate-distortion.

In some examples, mode selection unit 202 may determine that a number of color components use for palette mode encoding the current block is equal to one when the current block is coded with single tree partitioning enabled and when the current block is coded in monochrome format. Palette mode unit 227 may palette mode decode the current block based on the determined number of color components used for palette mode decoding the current block being equal to one.

Figure 4:
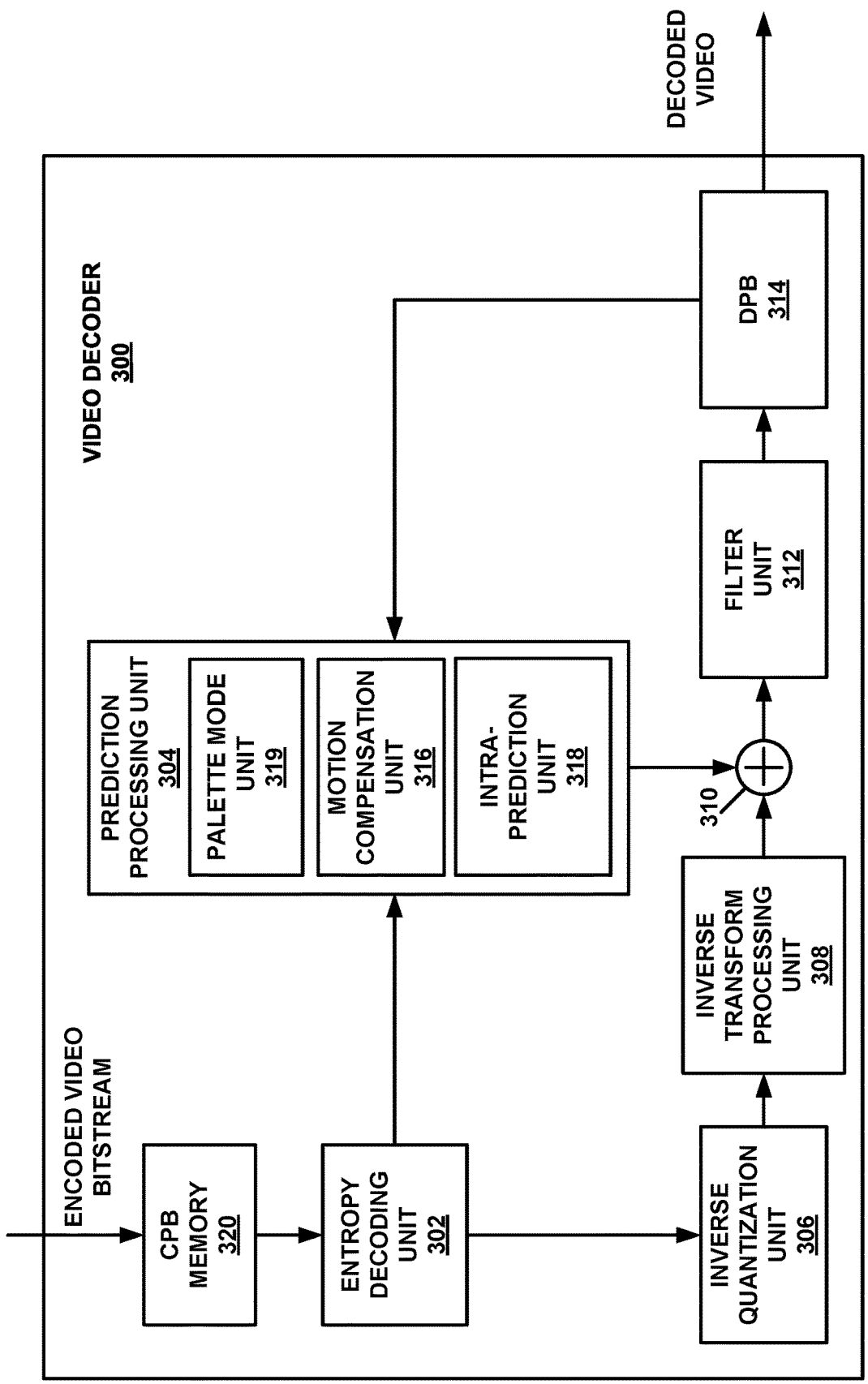
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

The above describes example techniques for inter-prediction and intra-prediction. In one or more examples, video decoder 300 may be configured to perform palette mode coding, as described above. For instance, as illustrated, video decoder 300 may include palette mode unit 319. In one or more examples, palette mode unit 319 may be configured to determine a number of color components used for palette mode decoding the current block (e.g., palette mode unit 319 may determine the value for numComps based on numComps=(treeType==SINGLE_TREE) ?(ChromaArrayType==0 ? 1:3): (treeType==DUAL_TREE_CHROMA)? 2:1.

For example, prediction processing unit 304, based on syntax elements signaled by video encoder 200 and received from entropy decoding unit 302, may determine that a current block of the video data is coded in palette mode. Prediction processing unit 304 may determine, between single tree or dual tree partitioning, whether the current block is coded with single tree partitioning or dual tree partitioning. For example, prediction processing unit 304 may receive syntax elements that video encoder 200 signaled that indicate whether single tree partitioning or dual tree partitioning is enabled. In some examples, prediction processing unit 304 may determine, between single tree or dual tree partitioning, that the current block is coded with single tree partitioning enabled (e.g., determine that treeType is equal to SINGLE_TREE).

Prediction processing unit 304 may determine that the current block is coded in monochrome format (e.g., based on the value of ChromaArrayType). As one example, in response to determining that the current block is coded with single tree partitioning enabled, prediction processing unit 304 may determine whether the current block is coded in monochrome format or not. For instance, in response to treeType being equal to SINGLE_TREE, prediction processing unit 304 may determine whether ChromaArrayType is equal to 0. When the current block is coded with single tree partitioning enabled and when the current block is coded in monochrome format, prediction processing unit 304 may determine that a number of color components used for palette mode decoding the current block is equal to one (e.g., numComps equals 1).

That is, in response to determining that the current block is coded with single tree partitioning enabled, prediction processing unit 304 may determine that the current block is coded in monochrome format. Also, in response to determining that the current block is coded with single tree partitioning enabled and in response to determining that the current block is coded in monochrome format, prediction processing unit 304 may determine that the number of color components used for palette mode coding is equal to one.

In one or more examples, prediction processing unit 304 may be configured to perform operations defined in a palette mode coding syntax structure. One non-limiting example of the palette mode coding syntax structure is the 7.3.9.6 Palette coding syntax structure described above. When the current block is coded with single tree partitioning enabled and when the current block is coded in monochrome, prediction processing unit 304 may be configured to determine that the number of color components used for palette mode decoding the current block is equal to one as part of performing the operations defined in the palette mode coding syntax structure.

Palette mode unit 319 may be configured to palette mode decode the current block based on the determined number of color components used for palette mode decoding the current block being equal to one. For example, palette mode unit 319 may decode the current block based on a palette mode table only for luma component. In some examples, video encoder 200 may signal information for the palette mode table, such as the sample values of the palette mode table, and palette mode unit 319 may construct the palette mode table with the sample values. In this example, because the current block is coded in monochrome format, there may only be luma sample values in the palette mode table. In one or more examples, palette mode unit 319 may receive an index into the palette mode table for a sample in the current block, and assign the sample in the current block a luminance value based on the index into the palette mode table.

In the above example, the current block may be considered as a first block. In some examples, prediction processing unit 304 may determine that a second block is coded in palette mode, and determine, between single tree or dual tree partitioning, that the second block is coded with single tree partitioning enabled.

In this example, assume that prediction processing unit 304 determines that the second block is not coded in monochrome format (e.g., ChromaArrayType is not equal to 0). When the second block is coded with single tree partitioning enabled and when the second block is not coded in monochrome format, prediction processing unit 304 may determine that a number of color components used for palette mode coding the second block is equal to three (e.g., numComps is equal to three because treeType is SINGLE_TREE and ChromaArrayType is not 0 in numComps= (treeType==SINGLE_TREE) ? (<ADD> ChromaArrayType==0 ? 1</ADD>:3): (treeType==DUAL_TREE_CHROMA) ? 2:1).

Palette mode unit 319 may then palette mode decode the second block based on the determined number of color components used for palette mode coding the second block being equal to three. For instance, in this example, the palette mode table may include sample values for luma and chroma components since there are three color components.

In this manner, video decoder 300 represents an example of a video decoding device including a memory configured to store video data, and one or more processing units implemented in circuitry and configured to determine that one or more blocks are for monochrome content and decode the one or more blocks with palette mode. In some examples, to determine that the one or more blocks are for (e.g., include or contain) monochrome content, the processing units may be configured to determine (e.g., receive) a value of a chroma format (e.g., chroma_format_idc), where the value indicates that the one or more blocks are for monochrome content. In some examples, to determine that the one or more blocks are for monochrome content, the processing units may determine a value of a separate color plane flag, wherein the value indicates that each color plane is coded as monochrome content, and wherein at least one color plane includes the one or more blocks. In some examples, the processing units may be configured to determine that one or more blocks are for (e.g., include or contain) separate color plane coding and decode the one or more blocks with palette mode. In some examples, the processing units may be configured to determine a number of color components for the palette mode based on at least one of tree type or chroma format.

Figure 5:
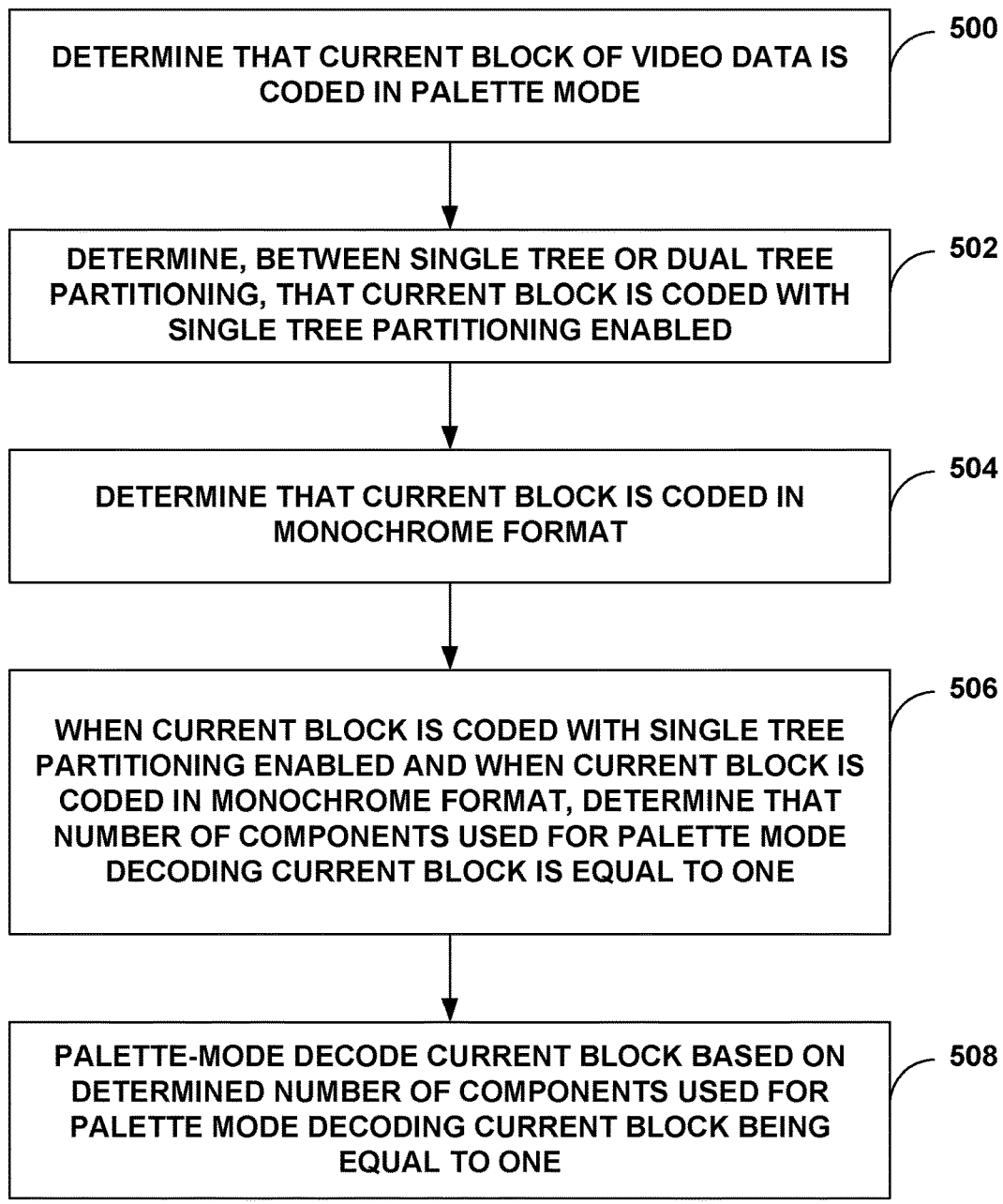
FIG. 5 is a flowchart illustrating an example of coding video data.

FIG. 5 is a flowchart illustrating an example method for encoding a current block. The current block may comprise a current CU. The example of FIG. 5 is described with memory, examples of which include memory 120, CPB memory 320, DPB 314, or some other memory and processing circuitry, examples of which include video decoder 300 and components of video decoder 300. For example, the example of FIG. 5 describes a device for decoding video data, where the device includes memory configured to store video data, and processing circuitry coupled to the memory and configured to perform one or more example techniques.

For example, processing circuitry may determine that a current block of the video data is coded in palette mode (500) (e.g., based on signaled information). The processing circuitry may also determine, between single tree or dual tree partitioning, that the current block is coded with single tree partitioning enabled (502) (e.g., based on signaled information).

The processing circuitry may determine that the current block is coded in monochrome format (504). As one example, in response to determining that the current block is coded with single tree partitioning enabled, the processing circuitry may determine that the current block is coded in monochrome format. For example, in response to determining that treeType equals SINGLE_TREE, the processing circuitry may determine whether ChromaArrayType is equal 0 or not, and in this example, the processing circuitry may determine that the current block is coded in monochrome format (e.g., ChromaArrayType is equal to 0).

When the current block is coded with single tree partitioning enabled and when the current block is coded in monochrome format, the processing circuitry may determine that a number of color components used for palette mode decoding the current block is equal to one (506). For example, in response to determining that the current block is coded with single tree partitioning enabled and in response to determining that the current block is coded in monochrome format, the processing circuitry may determine that the number of color components used for palette mode decoding is equal to one.

As one example, the processing circuitry may be configured to perform operations define in a palette mode coding syntax structure. In such examples, to determine that the number of color components used for palette mode decoding the current block is equal to one, the processing circuitry may be configured to determine that the number of color components used for palette mode decoding the current block is equal to one as part of performing the operations defined in the palette mode coding syntax structure. For example, the operations defined by the palette mode coding syntax structure may include determination of numComps, which is numComps=(treeType==SINGLE_TREE) ? (ChromaArrayType==0 ? 1:3): (treeType==DUAL_TREE_CHROMA) ? 2:1. In the equation for numComps, if treeType is SINGLE_TREE (e.g., single tree partitioning is enabled) and if ChromaArrayType is 0 (e.g., monochrome format), then numComps equals 1.

The processing circuitry may be configured to palette mode decode the current block based on the determined number of color components used for palette mode decoding the current block being equal to one (508). For example, the processing circuitry may palette mode decode the current block based on a palette mode table only for luma component. As one example, the processing circuitry may receive an index into the palette mode table for a sample in the current block and assign the sample in the current block a luminance value based on the index into the palette mode table.

In the above example, treeType was SINGLE_TREE (e.g., single tree partitioning is enabled) and ChromaArrayType was 0 (e.g., monochrome format), and for this case, numComps was equal 1. However, in some examples, for a second block that is coded in palette mode and with single tree partitioning mode enabled, the processing circuitry may determine that the second block is not coded in monochrome format (e.g., ChromaArrayType is not equal to 0).

In this case, when the second block is coded with single tree partitioning enabled and when the second block is not coded in monochrome format, the processing circuitry may determine that a number of color components used for palette mode decoding the second block is equal to three. For example, numComps=(treeType==SINGLE_TREE) ? (ChromaArrayType==0 ? 1:3): (treeType==DUAL_TREE_CHROMA) ? 2:1. Accordingly, if treeType is SINGLE_TREE, but ChromaArrayType does not equal 0, then numComps equals 3.

The processing circuitry may palette mode decode the second block based on the determined number of color components used for palette mode decoding the second block being equal to three. For example, the palette mode table may include sample values for luma and chroma components, rather than only luma component as may be for monochrome format.

Figure 6:
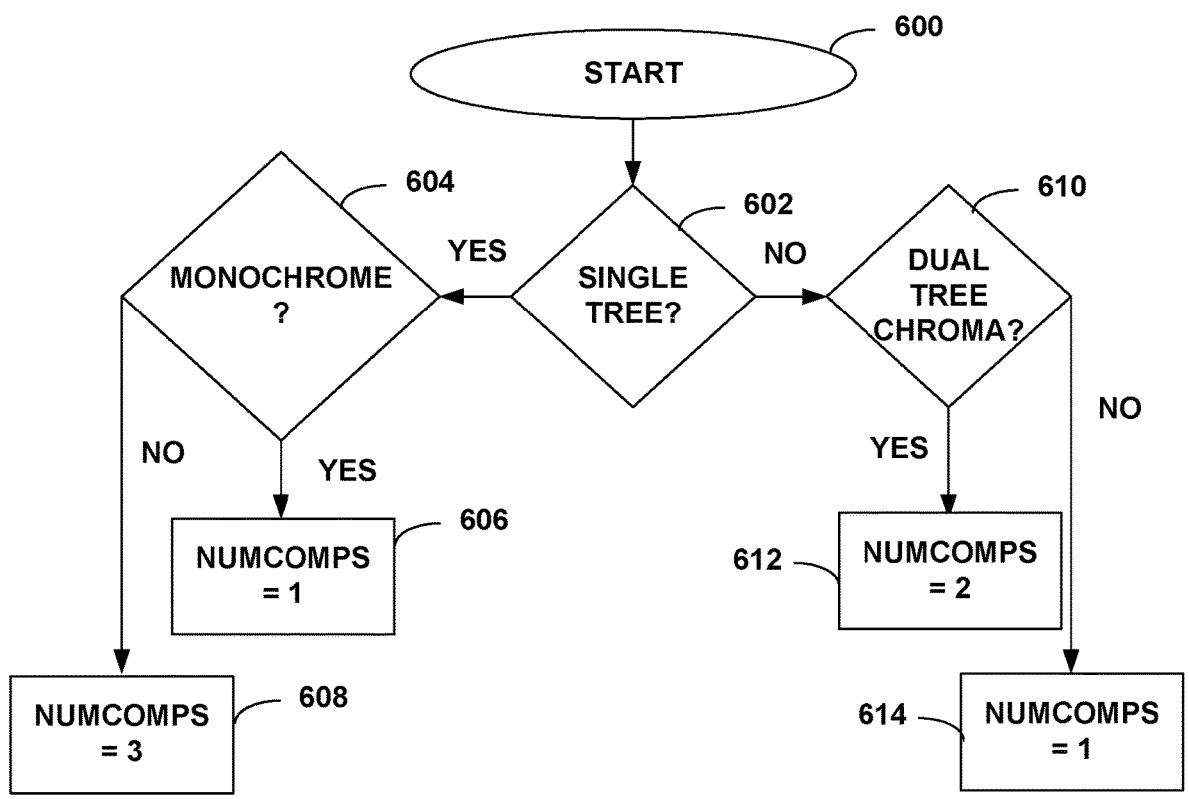
FIG. 6 is a flowchart illustrating an example technique described in this disclosure.

FIG. 6 is a flowchart illustrating an example technique described in this disclosure. FIG. 6 is described with respect to processing circuitry, example of which includes video encoder 200 or video decoder 300. FIG. 6 describes a manner in which processing circuitry may determine a number of color components used for palette mode coding in accordance with numComps= (treeType==SINGLE_TREE) ?(ChromaArrayType==0 ? 1:3):(treeType==DUAL_TREE_CHROMA) ? 2:1.

The processing circuitry may start (600) and determine, between dual tree partitioning and single tree partitioning, whether single tree partitioning is enabled for a current block (602) (e.g., determine whether treeType==SINGLE_TREE or not). In response to determining that single tree partitioning is enabled for the current block (YES of 602), the processing circuitry may determine whether the current block is coded in monochrome format (604) (e.g., whether ChromaArrayType is equal to 0 or not).

In response to determining that the current block is coded in monochrome format (YES of 604), the processing circuitry may determine that numComps=1, which may mean that when the current block is coded with single tree partitioning enabled and when the current block is coded in monochrome format, the processing circuitry may determine that a number of color components used for palette mode coding the current block is equal to one. In response to determining that the current block is not coded in monochrome format (NO of 604), the processing circuitry may determine that numComps=3, which may mean that when the current block is coded with single tree partitioning enabled and when the current block is not coded in monochrome format, the processing circuitry may determine that a number of color components used for palette mode coding the current block is equal to three.

In response to determining that the current block is not coded with single tree partitioning (e.g., dual tree partitioning is enabled) (NO of 602), the processing circuitry may determine whether the chroma component or the luma component is being processed (610). In response to determining that the chroma components are being processed (YES of 610), the processing circuitry may determine that numComps=2 (612). In this example, numComps equals two because there are two color components (e.g., Cb and Cr). In response to determining that the chroma components are not being processed (NO of 610), which means that the luma component is being processed, the processing circuitry may determine that numComps=1. In this example, numComps equals one because there is only the luma component that is being processed (614).

The following techniques, described as clauses, may be performed together or in any combination. The example techniques should not be considered limited to the following clauses.

Clause 1. A method of coding video data, the method comprising determining that one or more blocks of the video data are for monochrome content, and coding the one or more blocks with palette mode.

Clause 2. The method of clause 1, wherein determining that the one or more blocks are for monochrome content comprises determining a value of a chroma format, wherein the value indicates that the one or more blocks are for monochrome content.

Clause 3. The method of clause 1, wherein determining that the one or more blocks are for monochrome content comprises determining a value of a separate color plane flag, wherein the value indicates that each color plane of a plurality of color planes is coded as monochrome content, and wherein at least one of the color planes includes the one or more blocks.

Clause 4. A method of coding video data, the method comprising determining that one or more blocks of the video data are for separate color plane coding, and coding the one or more blocks with palette mode.

Clause 5. The method of any of clauses 1-4, further comprising determining a number of color components for the palette mode based on at least one of tree type or chroma format.

Clause 6. A method comprising any one or combination of clauses 1-5.

Clause 7. The method of any of clauses 1-6, wherein coding comprises decoding.

Clause 8. The method of any of clauses 1-6, wherein coding comprises encoding.

Clause 9. A device for coding video data, the device comprising a memory configured to store the video data and processing circuitry coupled to the memory and configure to perform the method of any one or any combination of clauses 1-8.

Clause 10. The device of clause 9, further comprising a display configured to display decoded video data.

Clause 11. The device of any of clauses 9 and 10, wherein the device comprises one or more of a camera, a computer, a mobile device, a broadcast receiver device, or a set-top box.

Clause 12. The device of any of clauses 9-11, wherein the device comprises a video decoder.

Clause 13. The device of any of clauses 9-11, wherein the device comprises a video encoder.

Clause 14. A computer-readable storage medium having stored thereon instructions that, when executed, cause one or more processors to perform the method of any of clauses 1-8.

Clause 15. A device for coding video data, the device comprising means for performing the method of any one or any combination of clauses 1-8.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a current block of the video data is coded in palette mode;
   performing operations defined in a palette mode coding syntax structure based on the current block being coded in the palette mode;
   as part of performing the operations defined in the palette mode coding syntax structure:
   determining, between single tree or dual tree partitioning, that the current block is coded with single tree partitioning enabled;
   determining that the current block is coded in monochrome format; and
   when the current block is coded with the single tree partitioning enabled and when the current block is coded in the monochrome format, determining that a number of color components used for palette mode decoding the current block is equal to one; and
   palette mode decoding the current block based on the determined number of color components used for palette mode decoding the current block being equal to one.

2. The method of claim 1, wherein determining that the current block is coded in monochrome format comprises:
   in response to determining that the current block is coded with single tree partitioning enabled, determining that the current block is coded in monochrome format.

3. The method of claim 1, wherein determining that the number of color components used for palette mode decoding is equal to one comprises:
   in response to determining that the current block is coded with single tree partitioning enabled and in response to determining that the current block is coded in monochrome format, determining that the number of color components used for palette mode decoding is equal to one.

4. The method of claim 1, wherein the current block comprises a first block, the method further comprising:
   determining that a second block is coded in palette mode;
   determining, between single tree or dual tree partitioning, that the second block is coded with single tree partitioning enabled;
   determining that the second block is not coded in monochrome format;
   when the second block is coded with single tree partitioning enabled and when the second block is not coded in monochrome format, determining that a number of color components used for palette mode decoding the second block is equal to three; and
   palette mode decoding the second block based on the determined number of color components used for palette mode decoding the second block being equal to three.

5. The method of claim 1, wherein palette mode decoding the current block comprises palette mode decoding the current block based on a palette mode table only for luma component.

6. The method of claim 5, wherein palette mode decoding the current block based on the palette mode table comprises:
   receiving an index into the palette mode table for a sample in the current block; and
   assigning the sample in the current block a luminance value based on the index into the palette mode table.

7. A device for decoding video data, the device comprising:
   a memory configured to store the video data; and
   processing circuitry coupled to the memory and configured to:
   determine that a current block of the video data is coded in palette mode;
   perform operations defined in a palette mode coding syntax structure based on the current block being coded in the palette mode;
   as part of performing the operations defined in the palette mode coding syntax structure:

determine, between single tree or dual tree partitioning, that the current block is coded with single tree partitioning enabled;

determine that the current block is coded in monochrome format; and when the current block is coded with the single tree partitioning enabled and when the current block is coded in the monochrome format, determine that a number of color components used for palette mode decoding the current block is equal to one; and palette mode decode the current block based on the determined number of color components used for palette mode decoding the current block being equal to one.

8. The device of claim 7, wherein to determine that the current block is coded in monochrome format, the processing circuitry is configured to:

in response to determining that the current block is coded with single tree partitioning enabled, determine that the current block is coded in monochrome format.

9. The device of claim 7, wherein to determine that the number of color components used for palette mode decoding is equal to one, the processing circuitry is configured to:

in response to determining that the current block is coded with single tree partitioning enabled and in response to determining that the current block is coded in monochrome format, determine that the number of color components used for palette mode decoding is equal to one.

10. The device of claim 7, wherein the current block comprises a first block, and wherein the processing circuitry is configured to:

determine that a second block is coded in palette mode;

determine, between single tree or dual tree partitioning, that the second block is coded with single tree partitioning enabled;

determine that the second block is not coded in monochrome format;

when the second block is coded with single tree partitioning enabled and when the second block is not coded in monochrome format, determine that a number of color components used for palette mode decoding the second block is equal to three; and palette mode decode the second block based on the determined number of color components used for palette mode decoding the second block being equal to three.

11. The device of claim 7, wherein to palette mode decode the current block, the processing circuitry is configured to palette mode decode the current block based on a palette mode table only for luma component.

12. The device of claim 11, wherein to palette mode decode the current block based on the palette mode table, the processing circuitry is configured to:

receive an index into the palette mode table for a sample in the current block; and assign the sample in the current block a luminance value based on the index into the palette mode table.

13. The device of claim 7, further comprising a display configured to display decoded video data.

14. The device of claim 7, wherein the device comprises one or more of a camera, a computer, a mobile device, a broadcast receiver device, or a set-top box.

15. A computer-readable storage medium having stored thereon instructions that, when executed, cause one or more processors to:

determine that a current block of the video data is coded in palette mode;

perform operations defined in a palette mode coding syntax structure based on the current block being coded in the palette mode;

as part of performing the operations defined in the palette mode coding syntax structure:

determine, between single tree or dual tree partitioning, that the current block is coded with single tree partitioning enabled;

determine that the current block is coded in monochrome format; and when the current block is coded with the single tree partitioning enabled and when the current block is coded in the monochrome format, determine that a number of color components used for palette mode decoding the current block is equal to one; and palette mode decode the current block based on the determined number of color components used for palette mode decoding the current block being equal to one.

16. A device for decoding video data, the device comprising:

means for determining that a current block of the video data is coded in palette mode;

means for performing operations defined in a palette mode coding syntax structure based on the current block being coded in the palette mode, wherein the means for performing the operations defined in the palette mode coding syntax structure comprises:

means for determining, between single tree or dual tree partitioning, that the current block is coded with single tree partitioning enabled;

means for determining that the current block is coded in monochrome format; and means for determining that a number of color components used for palette mode decoding the current block is equal to one when the current block is coded with the single tree partitioning enabled and when the current block is coded in the monochrome format; and means for palette mode decoding the current block based on the determined number of color components used for palette mode decoding the current block being equal to one.

17. The device of claim 16, wherein the means for determining that the current block is coded in monochrome format comprises:

means for determining that the current block is coded in monochrome format in response to determining that the current block is coded with single tree partitioning enabled.

18. The device of claim 16, wherein the means for determining that the number of color components used for palette mode decoding is equal to one comprises:

means for determining that the number of color components used for palette mode decoding is equal to one in response to determining that the current block is coded with single tree partitioning enabled and in response to determining that the current block is coded in monochrome format.

19. The device of claim 16, wherein the current block comprises a first block, the device further comprising:

means for determining that a second block is coded in palette mode;

means for determining, between single tree or dual tree partitioning, that the second block is coded with single tree partitioning enabled;
means for determining that the second block is not coded in monochrome format;
means for determining that a number of color components used for palette mode decoding the second block is equal to three when the second block is coded with single tree partitioning enabled and when the second block is not coded in monochrome format; and
means for palette mode decoding the second block based on the determined number of color components used for palette mode decoding the second block being equal to three.

20. The device of claim 16, wherein the means for palette mode decoding the current block comprises means for palette mode decoding the current block based on a palette mode table only for luma component.

21. The device of claim 20, wherein the means for palette mode decoding the current block based on the palette mode table comprises:
means for receiving an index into the palette mode table for a sample in the current block; and
means for assigning the sample in the current block a luminance value based on the index into the palette mode table.

* * * * *